UNITED STATES PATENT OFFICE.

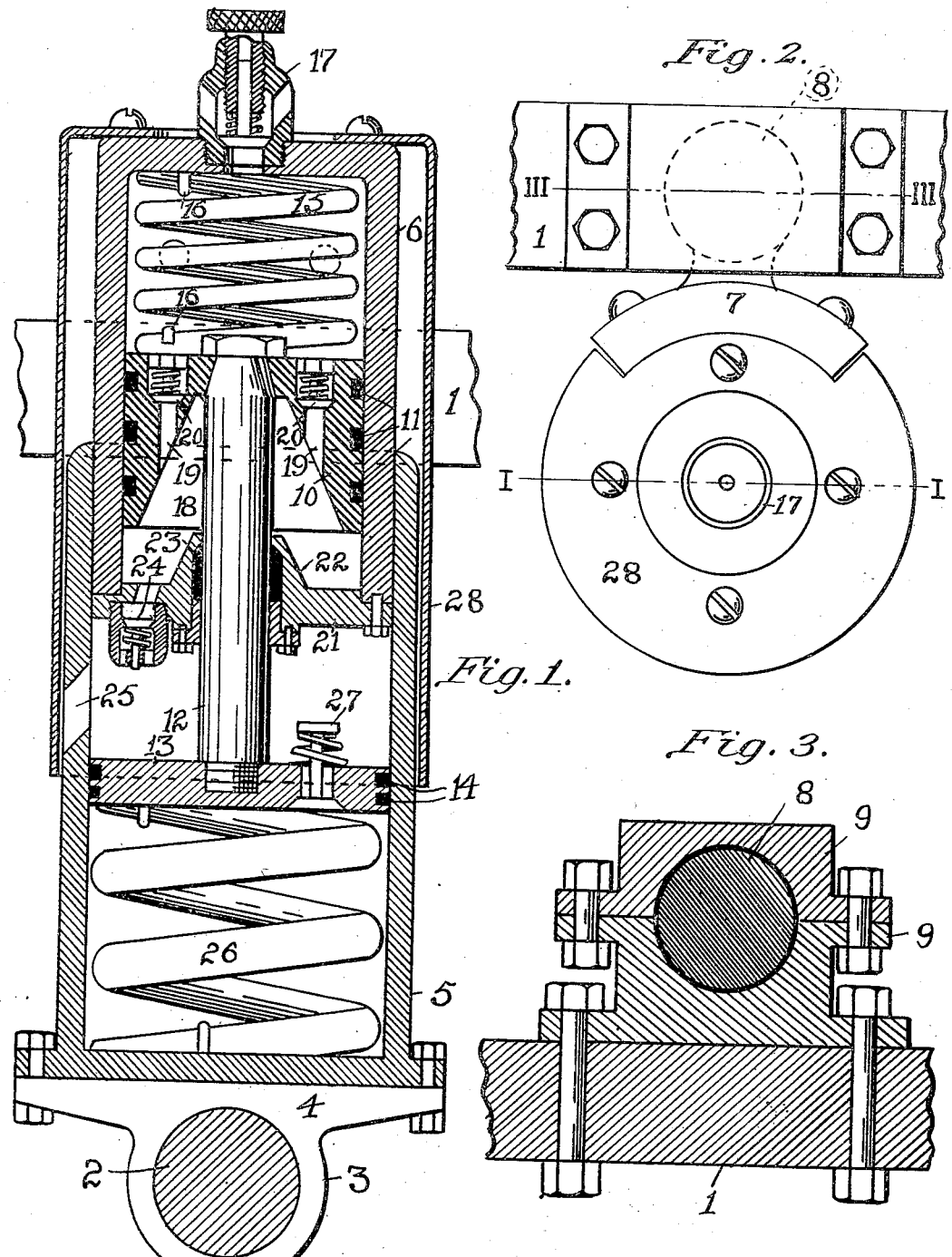

JOHN G. FUNK, OF SWISSVALE BOROUGH, PENNSYLVANIA.

AIR-CUSHION DEVICE FOR VEHICLES.

1,055,734. Specification of Letters Patent. Patented Mar. 11, 1913.

Application filed December 21, 1911. Serial No. 667,220.

*To all whom it may concern:*

Be it known that I, JOHN G. FUNK, a citizen of the United States, residing in the borough of Swissvale, in the county of Allegheny and State of Pennsylvania, have invented or discovered new and useful Improvements in Air-Cushion Devices for Vehicles, of which the following is a specification.

My invention consists of a new and improved air-cushion device intended as a substitute for resilient metal vehicle springs.

While primarily intended for use in automobile or power-driven vehicle construction, my invention is equally applicable to all sorts of vehicles.

Generally speaking, it consists of a cylinder mounted on the frame or axle of a vehicle, a piston moving therein, a rod secured to said piston, a second piston mounted on said rod and a second cylinder mounted on the axle or frame of the vehicle, in which said second piston moves. Springs are preferable installed between the inner ends of said cylinders and the pistons working therein. Means are also provided for establishing air pressure between the inner end of said first cylinder and its piston. A flexible connection is used to secure in place the cylinder mounted on the frame.

Other novel features of construction and arrangement will appear from the following description.

In the accompanying drawings, Figure 1 is a vertical section of my invention taken along the line I—I in Fig. 2; Fig. 2 is a top plan view of the same, and Fig. 3 is a vertical section along the line III—III in Fig. 2.

1 is a portion of the frame or body of a vehicle, and 2 one of the axles.

3 is a collar surrounding and rigidly secured to the axle 2 and supporting an integral horizontal bed-plate 4.

5 is a closed bottom cylinder secured on plate 4. 6 is a second cylinder telescoping in cylinder 5 and having a closed upper end.

7 is a lug secured to the upper perimeter of the cylinder 6 and provided with an outwardly extending ball 8.

9—9 are socket members secured to the frame 1 and to each other to contain the ball 8, thus forming a ball and socket connection between the cylinder 6 and the frame 1.

10 is a piston working in cylinder 6 and provided with packing rings 11—11.

12 is the piston rod secured to piston 10 and having mounted on its lower end a second piston 13 of larger diameter and working in the lower part of cylinder 5.

14—14 are packing rings on piston 13.

15 is a spring mounted above the piston 10 in cylinder 6 and preferably secured at its ends to said piston and said cylinder, respectively, as at 16—16.

17 is an adjustable pressure valve on the upper end of cylinder 6 communicating with the interior thereof.

The piston 10 is cored to form an upwardly extending recess 18 preferably cone-shaped.

19—19 represent ports leading through the piston and provided with inwardly opening valves 20—20 controlled by weak springs.

21 is the removable head of cylinder 6 having a central upwardly extending boss 22 through which the piston rod 12 passes.

23 is the packing gland surrounding said piston rod.

24 is an upwardly opening inlet valve in head 21 controlled by a weak spring.

25 is an open port in the wall of cylinder 5 below the travel of cylinder 6 and above the travel of piston 13.

26 is a coiled spring in the bottom of cylinder 5 and secured at its ends to said cylinder and to the piston 13.

27 is a downwardly opening valve in the piston 13 controlled by a weak spring.

28 is a cylindrical dust shield secured to the top of cylinder 6 and depending about the upper portion of cylinder 5 to prevent the entrance of dust or mud into the cylinder, said shield being of sufficiently large diameter to freely admit air.

The operation of my invention is as follows, it being understood that preferably four of my devices are installed on the vehicle, two to each axle in place of the usual resilient metal springs: Assuming that atmospheric pressure exists in cylinder 6 above the piston 10, the relief valve 17 is set to any desired pressure sufficient to carry the load of the vehicle. If the vehicle is lightly loaded, less pressure will be required, while in the case of a heavily loaded vehicle, great pressure will be required. If 25 pounds pressure be sufficient, the valve 17 is set to relieve when the pressure rises above that amount, thus automatically maintaining the pressure above the piston 10 at 25 pounds. When the vehicle is in motion the resiliency of the spring 15 assisted by the spring 25 will cause a reciprocation between the cylinder 6 and the piston 10. The piston 10 in descending will compress the air contained in the lower portion of the cylinder 6, forcing open the valves 20—20 and admitting the compressed air to the top of said cylinder. The ascent of the piston 10 will open the valve 24 admitting a fresh supply of air, part of which will be injected into the chamber above the piston during the next descent of the latter. It is thus evident that the pressure in the top of cylinder 6 will quickly be raised to the degree determined upon to cushion the vehicle against the jars and shocks exerted on the wheels by travel. This pressure will be maintained by the automatic action of the valve 17.

It will be noted that the contracted bore of the piston 10 coacting with the boss 22 cuts down the capacity of the chamber in the lower portion of the cylinder 6 so that the pressure obtained therein is magnified, aiding materially in charging the upper portion of the cylinder 6. The descent of the cylinder 6 corresponding to the ascent of piston 10 assists in charging the lower portion of the cylinder through the valve 24. It will also be noted that the shape of the chamber below the piston 10 is substantially that of a truncated cone into which the boss 22 extends. It is thus evident that the pressure in said chamber, as it contracts, will increase at an accelerated speed, shooting the air at an increasing pressure through the valves 20—20 as the stroke progresses. The port 25 remains open to supply air to the cylinders. The spring 26 gives a resilient support to the piston 13 and the piston rod 12 preventing knocking and adding to the elasticity of the device. The valve 27 maintains a sufficient air supply in the bottom of cylinder 5 to cushion the action of spring 26.

When the cylinder 5 is rigidly mounted on the axle, it is necessary to provide a flexible attachment of the cylinder 6 to the frame 1. This is provided by the ball and socket mechanism above described.

The advantages of my invention are manifold. The device, when adjusted, automatically pumps itself up to the proper pressure and maintains an air-cushion of the necessary density to adequately cushion and neutralize the shocks and jars of travel, at the same time completely eliminating the bouncing incident to the use of resilient metal springs in going over uneven surfaces. The elimination of leaf-springs prevents breakage, especially in cold weather. The device is inexpensive, durable, and automatic in operation and insures smooth, comfortable and safe riding under all sorts of loads. This is an especial advantage in the case of heavy vehicles, such as trucks, the truck, when empty, riding as smoothly as when fully loaded, thus relieving the motor and transmission mechanism of much rough and injurious usage. The flexible attachment of the device to the frame prevents torsional twist or strain on the device.

What I desire to claim is:—

1. In combination with the frame and the axle of a vehicle, a cylinder mounted on the axle, a second cylinder mounted on the frame, pistons in said cylinders, a common piston rod for said pistons, means for establishing a compressed air cushion in one of said cylinders for its piston, and a pressure relief valve in said last named cylinder.

2. In combination with the frame and the axle of a vehicle, a cylinder mounted on the axle, a second cylinder mounted on the frame and telescoping the first cylinder, pistons in said cylinders, a common piston rod for said pistons, and means for establishing a compressed air cushion in said second cylinder for its piston.

3. In combination with the frame and the axle of a vehicle, a cylinder mounted on the axle, a second cylinder mounted on the frame and telescoping the first cylinder, pistons in said cylinders, springs in said cylinders engaging said pistons, a common piston rod for said pistons, and means for establishing a compressed air cushion in said second cylinder for its piston.

4. In combination with the frame and axle of a vehicle, a cylinder mounted on the axle, a second cylinder in movable relation to said first named cylinder mounted on the frame, pistons in said cylinders, means for cushioning said pistons in said cylinders, and a common piston rod for said pistons.

5. In combination with the frame and the axle of a vehicle, a cylinder mounted on the axle, a second cylinder mounted on the frame and telescoping the first cylinder, pistons in said cylinders, means for cushioning said pistons in said cylinders, and a common piston rod for said pistons.

6. In combination with the frame and the axle of a vehicle, a cylinder mounted on the axle, a second cylinder flexibly mounted on the frame and telescoping said first cylinder, pistons in said cylinders, means for cushioning said pistons in said cylinders, and a common piston rod for said pistons.

7. In combination with the frame and the axle of a vehicle, a cylinder mounted on the axle, a piston in said cylinder, means for cushioning said piston in said cylinder, a second cylinder in movable relation to said first named cylinder flexibly mounted on the frame, a piston in said cylinder, means for establishing an air cushion in said second cylinder for said second piston, a pressure relief valve in said second cylinder, and a common piston rod for said pistons.

Signed at Pittsburgh, Penna., this 20th day of December 1911.

JOHN G. FUNK.

Witnesses:
E. A. LAWRENCE,
W. S. WALSH.